United States Patent [19]

Courneya

[11] 4,330,946
[45] May 25, 1982

[54] HIGH EFFICIENCY MATERIAL DRYING

[75] Inventor: Calice G. Courneya, Alexandria, Minn.

[73] Assignees: Ralph S. Tillitt; Ronald C. Rutten, both of Alexandria, Minn.

[21] Appl. No.: 189,905

[22] Filed: Sep. 23, 1980

[51] Int. Cl.[3] ..... F26B 3/34

[52] U.S. Cl. ..... 34/1; 34/17; 34/35; 34/68; 34/86; 34/92; 219/10.55 R

[58] Field of Search ..... 34/1, 17, 18, 68, 180, 34/181, 182, 183, 210, 216, 217, 92, 86, 35, 242; 198/662; 219/10.55 R, 10.55 M

[56] References Cited

U.S. PATENT DOCUMENTS

| | | | |
|---|---|---|---|
| 2,444,383 | 6/1948 | Stynler | 34/182 |
| 2,622,342 | 12/1952 | Gouloünes et al. | 34/177 |
| 3,726,392 | 4/1973 | Rastoin | 198/662 |
| 3,889,391 | 6/1975 | Malcolm | 34/182 |
| 3,909,958 | 10/1975 | Castanoli | 34/180 |
| 4,015,341 | 4/1977 | McKinney et al. . | |
| 4,168,418 | 9/1979 | Bird | 34/1 |

*Primary Examiner*—Larry I. Schwartz
*Attorney, Agent, or Firm*—Merchant, Gould, Smith, Edell, Welter & Schmidt

[57] ABSTRACT

Apparatus for high-efficiency drying of material includes a vacuum drying chamber (40) maintained at a low pressure by a vacuum pump (56). Material to be dried is introduced to the drying chamber through an air lock valve (36) and is transported through the drying chamber by an auger (45). In the preferred embodiment a second interconnected drying chamber (50) includes a further auger (52), and material that has been dried is removed from the drying chamber by another air lock valve (55). Microwave energy sources (30) apply energy to vaporize liquid from the material, and air inlets (72, 73) are provided at the processed ends to introduce air for sweeping generally across the material to the outlet (55) to the vacuum pump. The sweep of cool air causes an aerosol mixture to form, which is removed by the vacuum pump. Heat is reclaimed by separating liquid and vapor, with the liquid being passed through hollow shafts (60, 51) of the augers to heat the material in the drying chamber, and the vapor being sent through a heat exchanger (15) in thermal contact with a preheat zone (13) so that heat from the vapor removed from the drying chamber, including latent heat of vaporization, is transferred to the material prior to introduction to the drying chamber.

37 Claims, 9 Drawing Figures

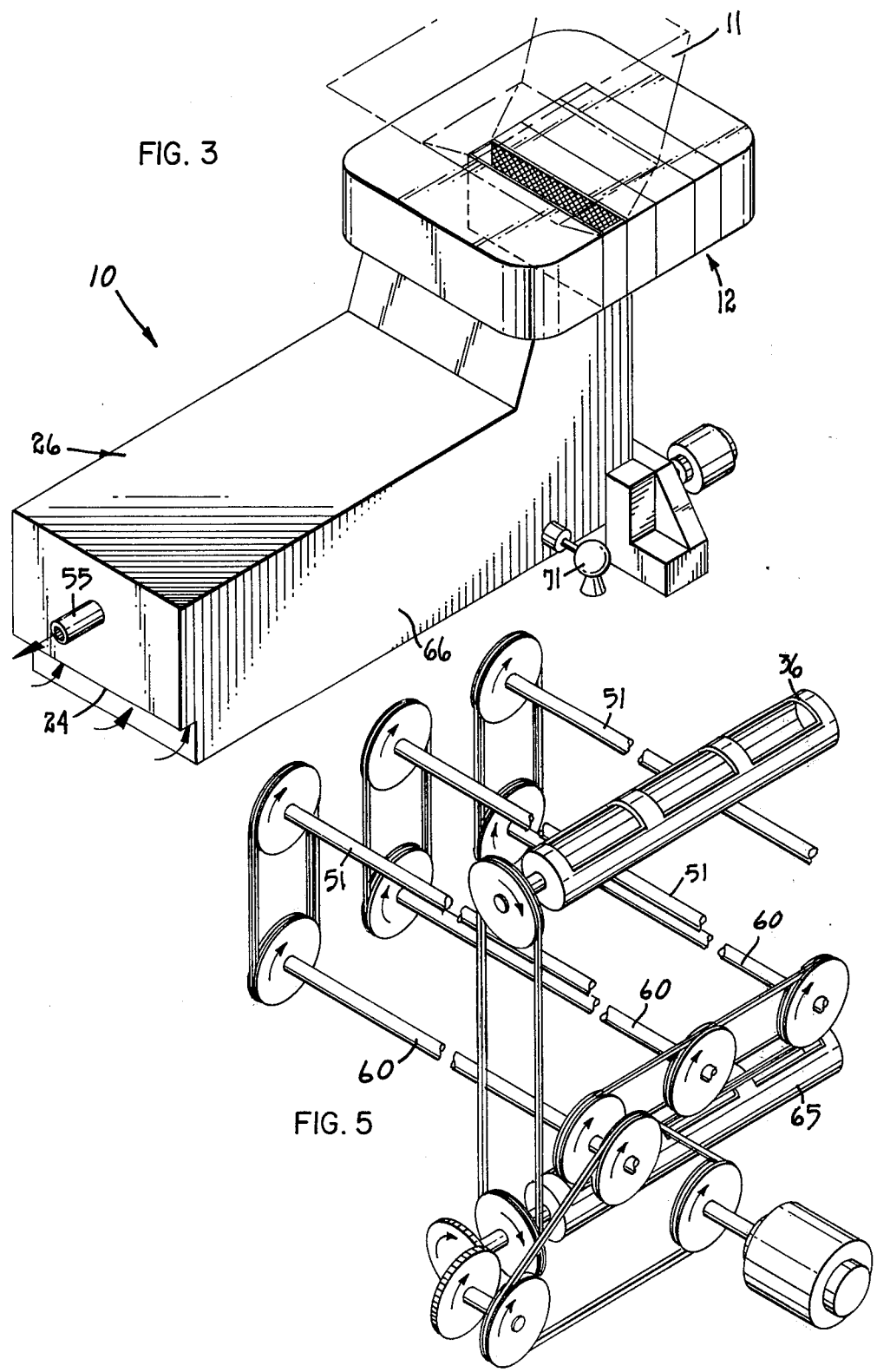

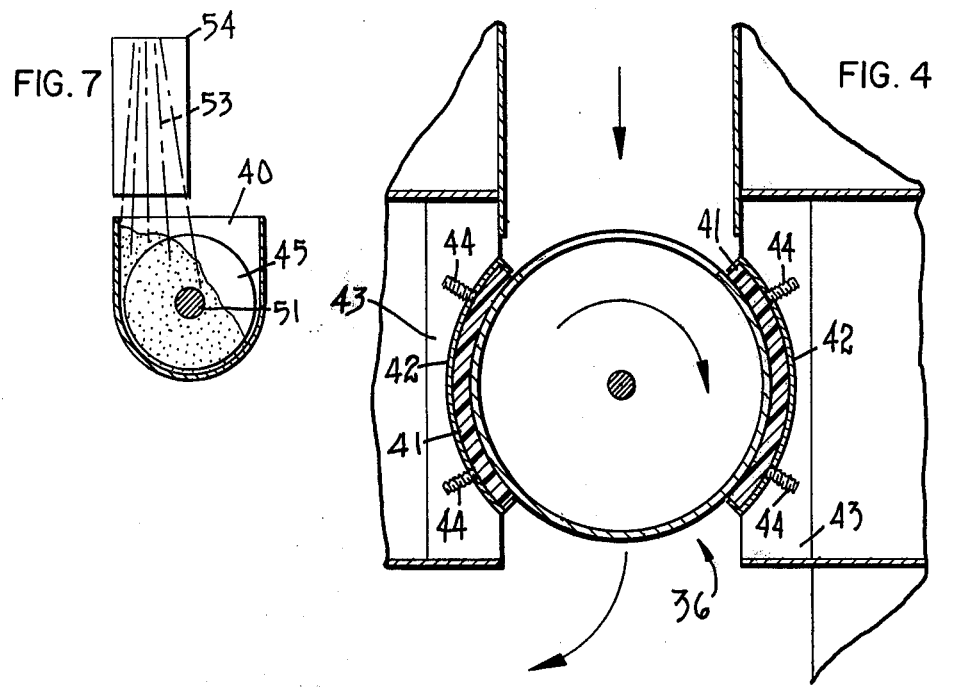
FIG. 7
FIG. 4
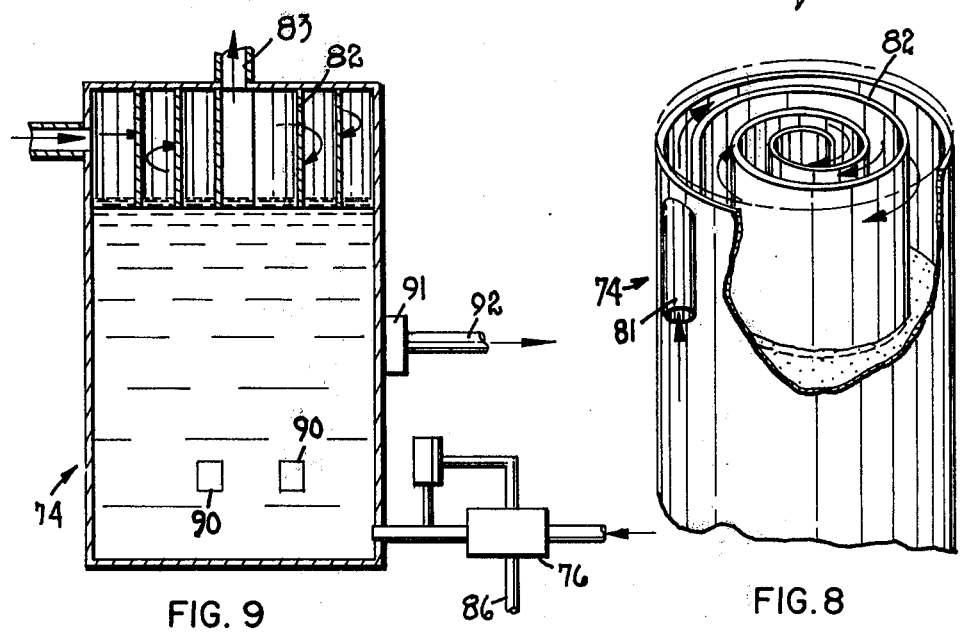
FIG. 9
FIG. 8

HIGH EFFICIENCY MATERIAL DRYING

TECHNICAL FIELD OF THE INVENTION

This invention pertains to the field of material drying apparatus and processes, and specifically to material drying with a high degree of energy efficiency. While not limited to any specific application, the invention is particularly suited to light industrial and agricultural drying.

BACKGROUND OF THE INVENTION

In the field of agricultural and light commercial dryers there are several established methods for drying solutions, slurries and particulate materials. Despite their outward differences, the established methods share common operating features. In the majority of the methods, the material to be dried is heated to a degree necessary for the liquid contained in the material to evaporate. The resulting vapor is then removed or allowed to escape from the dryer, thus yielding a drier material. However, the drying rate of such methods is limited by the particular substrate's capacity to transfer heat energy from the heat source, such as steam pipes. In most methods, the poor transfer of heat energy creates further problems of local overheating of portions of the material and uneven drying of the entire sample. Product quality lessens and fire hazards increase. Extensive agitation or tumbling of the material is often introduced in an effort to lessen the damaging effects of the overheating and uneven drying.

The energy demand of conventional methods is quite high, because the whole sample of material must be heated to the evaporation temperature to ensure adequate heat flow. Powerful electric fans are often required to blow hot air through the sample, air which is heated by using costly fuels such as propane. In the prior art systems the heated air and vaporized liquid are vented to the atmosphere. Despite the expensive high energy demand of such drying systems, little effort has been made to recapture and recycle the substantial losses of heat energy in the escaping vapor and heated air or to utilize heat generated by the dryer's equipment in the drying process itself.

In view of the increasing scarcity and cost of energy supplies, the inefficiencies and heat wastes of prior art drying techniques represent an increasingly serious problem for our society. This is particularly true in the field of agriculture, where the high energy consumption of present grain drying methods has serious economic implications both to food producers and consumers.

The present invention reduces considerably the energy demand for the drying process, and it also provides superior drying rates for solutions, slurries and solids unknown in the prior art. The present invention achieves consistent rates of evaporation and vapor removal, thereby eliminating local overheating and risk of fires, and thereby maintaining the valuable, original quality of the product. By reclaiming and recycling the energy supplies spent in the drying process, the energy demanded for the drying process is drastically reduced as compared to prior art methods.

As will be explained in detail in the specification, the present invention is not a variation of the inefficient methods known in the art, but is a revolutionary concept having broad application into wide areas of material drying, including drying sludge, concentrating fermentation liquors, dehydrating wastes, evaporating organic liquids, and numerous other applications involving drying procedures.

SUMMARY OF THE INVENTION

The present invention provides a method and apparatus for drying material, i.e., removing water or other vaporizable liquid from the material. The drying process of the invention includes placing the material to be dried in a vacuum drying chamber, applying microwave radiation energy to the material within the drying chamber to vaporize liquid therefrom, and reclaiming as heat energy a substantial portion of the energy applied by the microwave radiation means, including recovering the latent heat of vaporization of the evaporated liquid.

According to one aspect of a preferred embodiment of the invention, air lock valves which preferably comprise rotary air lock valves are used for introducing material into the drying chamber and removing dried material from the chamber, while maintaining the low pressure conditions with the chamber.

According to another aspect of a preferred embodiment of the invention, an auger, or a pair of augers in the case of a double chambered drying chamber, are used for transporting the material through the drying chamber during the drying process. According to one aspect of the heat reclaiming feature of the invention, the augers have hollow shafts through which warm water containing reclaimed heat is circulated, to transfer heat to the material in the drying chamber in contact with the auger flighting.

According to another aspect of the invention, air inlets are provided in the drying chamber, preferably at the process ends, for admitting cool air which is swept generally across the material to an exhaust outlet in the drying chamber which connects to a vacuum pump. Incoming cool air causes condensation of some of the evaporated liquid and forms an aerosol mixture, which is then removed from the drying chamber by the vacuum pump.

According to another aspect of the heat reclaiming feature of the invention, the aerosol is separated into liquid and vapor components, and the vapor portion is caused to give up its heat, including latent heat of vaporization of the liquid, through a heat exchanger in thermal contact with a preheating zone that preheats the material prior to introduction to the drying chamber.

BRIEF DESCRIPTION OF THE DRAWINGS

FIG. 3 is a perspective view of the housing for the preferred embodiment of the present invention;

FIG. 4 is a cross-section view of a rotating air lock valve of the present invention;

FIG. 5 is a schematic view in perspective of a mechanical linkage for a series of augers and rotating lock valves, according to one embodiment of the invention;

FIG. 7 is a schematic view showing a cross-section of a waveguide and primary auger of the system of FIG. 1;

FIG. 8 is a partial perspective of a liquid-vapor separator for use in the system of FIG. 1 with a cutaway view to show the helical element, water level and aerosol flows within the separator of the preferred embodiment of the present invention; and FIG. 9 is a cross-section view of the separator of FIG. 8 used in the preferred embodiment of the present invention.

DETAILED DESCRIPTION OF THE PREFERRED EMBODIMENT

Figure 1:
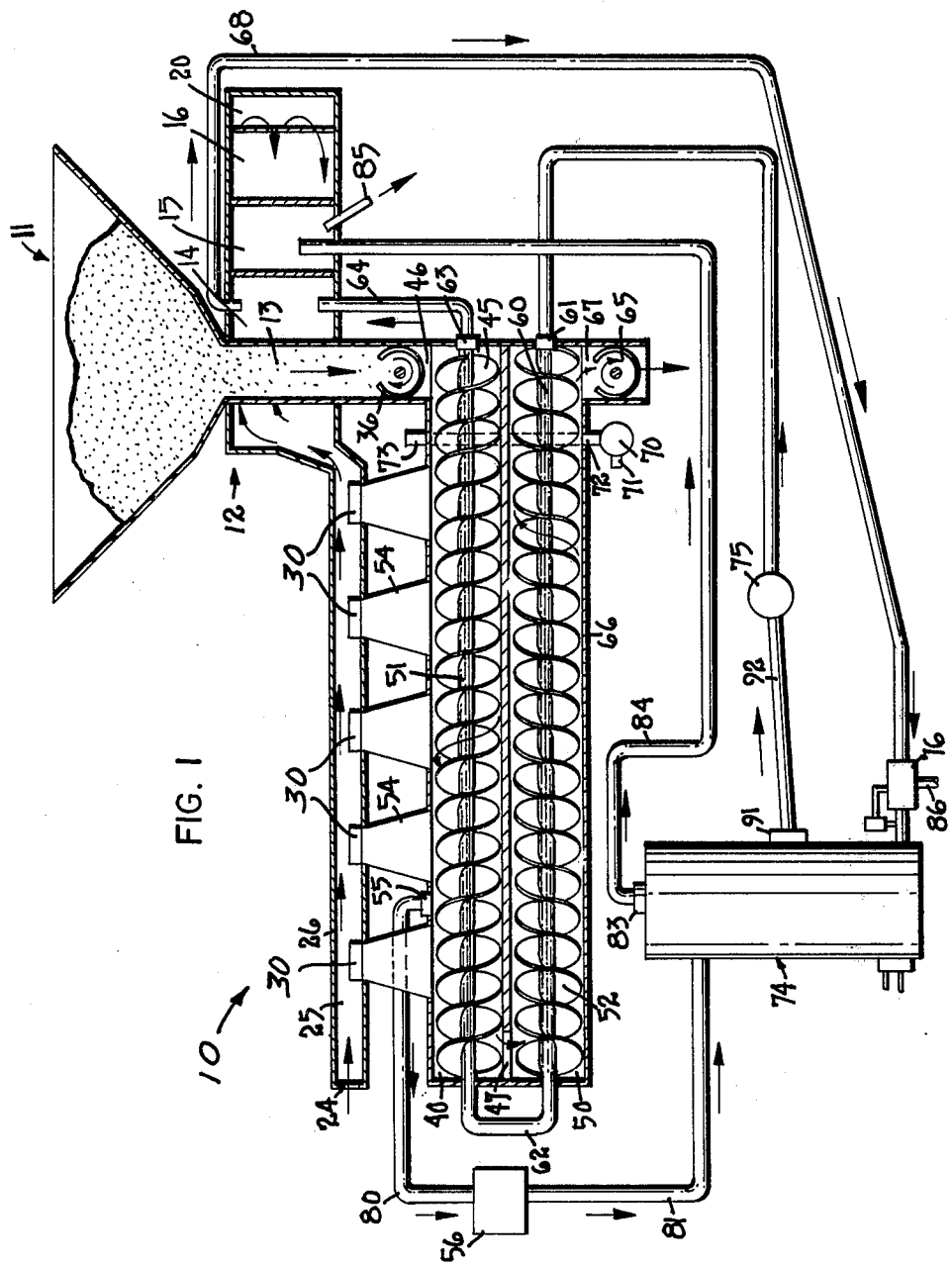
FIG. 1 is a schematic illustration of the preferred embodiment of the present invention showing material and heat flow paths.
Figure 2:
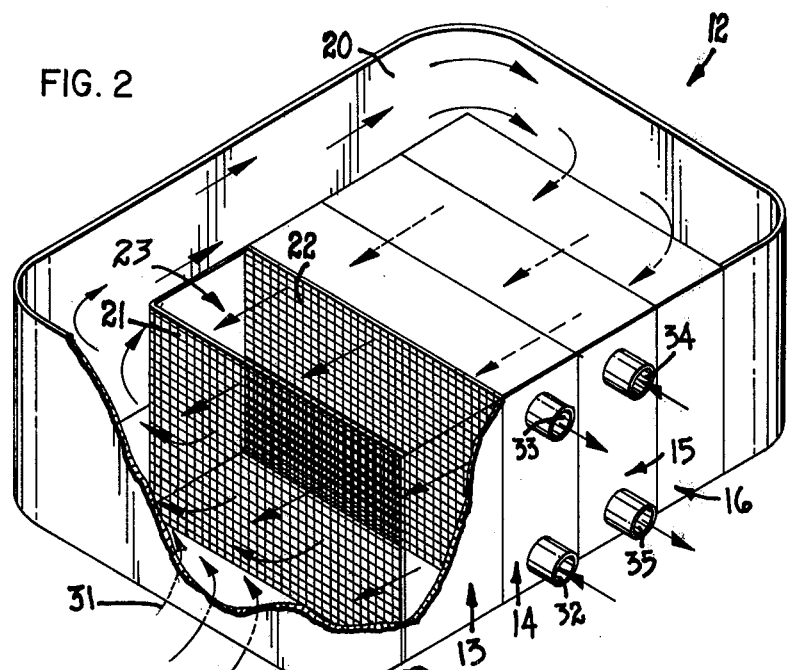
FIG. 2 is a partial cutaway perspective view of the preheater section of the preferred embodiment of the present invention.
Figure 6:
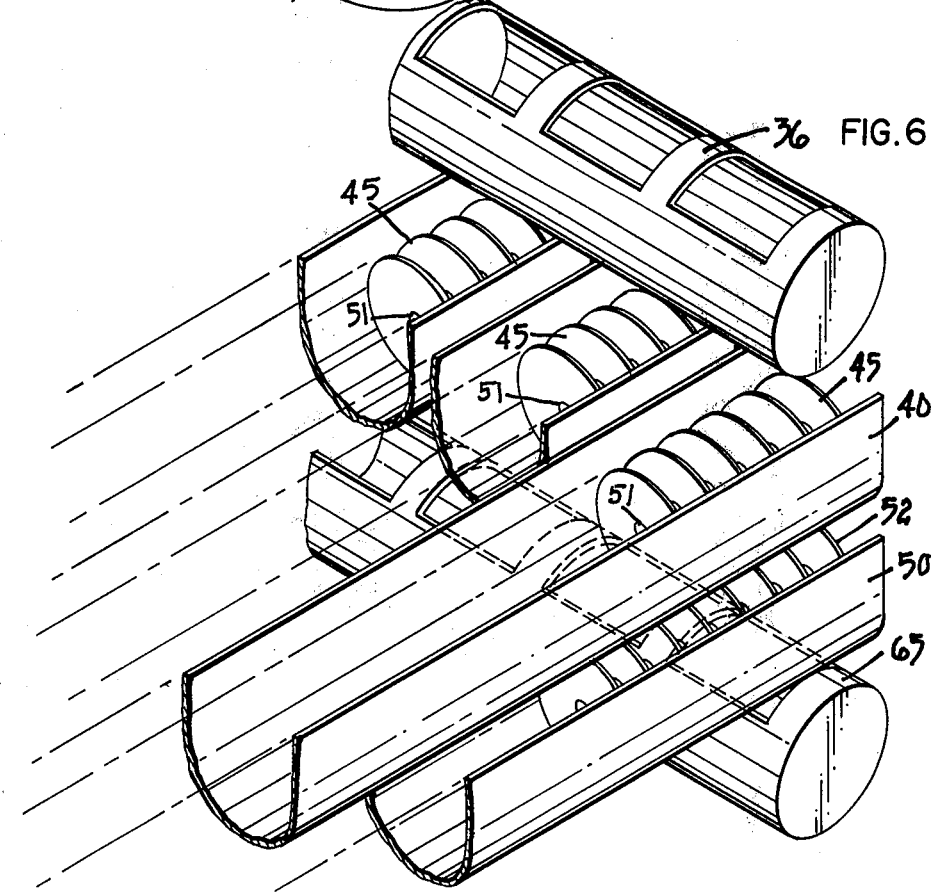
FIG. 6 is a partial perspective view of rotating lock valves and drying chamber augers according to one embodiment of the present invention.

Referring now to the drawings wherein like reference numerals designate identical or corresponding parts throughout the several views, and more particularly to FIG. 1, the reference number 10 generally designates the apparatus of the present invention. FIG. 1 is also symbolic of the basic operation of a series of like apparatus located adjacent each other providing a proportionately increased capacity for handling the material for drying purposes. For those skilled in the art, a description of the structure of a single apparatus for the present invention will provide the understanding necessary to practice the invention in its series embodiment as shown in FIGS. 5 and 6.

Mounted at a position generally above the apparatus 10 is a hopper 11 which contains the wet material prior to its entry into the drying system. Positioned beneath the hopper 11 is a preheater zone designated generally at 12 which will include a material passageway 13, two heat exchangers 14 and 15, blower or fan 16, and an enclosure 20 for circulating air through the heat exchangers and preheater zone. The wet material passageway 13 in the preferred embodiment is illustrated as a narrow duct 23 having two perforated sides 21 and 22 opposite each other, as can be seen more clearly in FIG. 2. The volume of the duct 23 in relation to that of the hopper 11 is such as to allow a layer of material to pass from the hopper 11 into the duct area 23. Attached along one of the perforated sides 22 of the passageway 13 is one of the heat exchangers 14, which in this embodiment is a water-to-air type heat exchanger. Mated to this first heat exchanger 14 is a second heat exchanger 15 which is an air-to-air type heat exchanger. Secured next to the second heat exchanger 15 and in line with the first heat exchanger 14 and material passageway 13 is a blower or fan 16. Surrounding these elements is an enclosure 20 for directing the flow of air. Makeup air will enter the apparatus of the present invention through a filter 24 located at the end of a duct 25 within housing 26. Makeup air is drawn to the apparatus housing 26 and duct 25 is configured to provide a pathway for the air over any electrical components, and magnetrons 30, so as to arrive in the preheater section 12 slightly warmed from the heat dissipated by those elements within the housing area. As shown in FIG. 2, the makeup air is drawn by the blower 16 into the enclosure 20, where it joins the air circulating through heat exchangers 14 and 15 into and through the perforated duct passageway 13.

Referring particularly to FIG. 2, the arrangement of the preheater section elements is shown more clearly. The directional arrows symbolize the air flow. The makeup air enters the preheater section in the area designated by 31. This area has a negative pressure relative to the area occupied by the heat exchangers 14, 15 and blower 16. This difference in pressure is caused by the blower and by a decrease in air volume within the preheater perforated duct area 23 as air is removed with the layer of material into the primary dryer chamber 40. Thus the entering makeup air flows in a pattern away from the perforated duct area 13, around the enclosure 20 towards and finally into the blower 16, through the heat exchangers 14 and 15, and through the layer of material in the duct area 13, with some of the air exiting with the material into the drying chamber 40. However, a greater portion of the air will continue to be forced on through the perforated side 21 of the duct, after having warmed the material in the preheater zone. The circulation is then repeated.

The function of heat exchangers 14 and 15 is to heat the air circulating through the preheater zone, thereby to warm the material therein, through the efficient use of heat reclaimed from other parts of the system, as explained more fully below. The moisture picked up by the air as it flows warm across the layer of material increases the ability of the air to transfer heat to the blower air from the heat exchangers. Thus, the preheater section 12 of the invention 10 is itself a minidrying process for the entering wet material as well as an energy recovery and recycling means within the purposes of the complete invention. The entrance and exit means 32, 33, 34, and 35 shown for the heat exchangers in FIG. 2 will be discussed in further detail below.

At the base of the material passageway 13 and below the preheater section 12 is a rotating air-lock or inlet valve 36 which can be more clearly seen in FIG. 4. Referring now to FIG. 4, the material falls from the hopper through the duct passageway, as shown by the directional arrows. The rotating lock valve 36 is a cylindrical member having an opening to receive a predetermined amount or increment of material. As it rotates it deposits the material into the drying chamber 40 below. The rotating lock valve 36 is constructed to provide a fluid seal between the preheater section 12 and the low pressure chamber 40 below the valve 36. Any suitable seal material 41 can be used. In the preferred embodiment tetrafluropolytheylene is used, although a material such as felt could also be used. The seal material must be placed strategically along the circumference of the valve on both sides thereof as shown in FIG. 4 for best sealing results. A pair of seal backing retainer means 42 support the seal material and a pair of seal blocks 43 support the retainer means. The entire arrangement of seal material 41, seal backing retainer means 42, and seal blocks 43 are held together by suitable means to provide an effective sealing area. The seal blocks have a means 44 such as springs or adjusting screws for adjusting the contact pressure of the sealing material to the cylinder. All components of the rotating lock valve 36 and its sealing means are separable and can be removed and inserted for replacement purposes.

After the material has been dropped out of the rotating lock valve 36 it falls into the primary low pressure drying chamber 40 where it is picked up and moved through the chamber 40 by the primary, double-flighting, heated auger 45. The primary low pressure chamber 40 includes a trough-like structure to receive the auger. At one end of the chamber 40 there is the entrance area 46 where the material is deposited from the rotating lock valve 36. At the chamber's other end is the exit port 47 for the drying material to enter the secondary low pressure chamber 50. The secondary drying chamber 50 is substantially identical to the construction of the primary chamber 40.

The primary chamber 40, as can be seen in FIG. 1, contains the double-flighting auger 45 running the length of the chamber. Auger 45 has a shaft 51 which is hollow to provide a passageway for hot water through the entire shaft length. Although an auger with a single helical flight could be used, in the preferred embodiment an auger having double, intertwined helical flighting is used in order to achieve the desired pitch of the flighting for optimum transport rate and rolling of the material. The pitch of the auger is important in order to provide a proper rolling of the grain over the shaft for effective drying. A single helix auger having a low pitch would give little or no rolling of the material and would essentially move the material en masse along an auger pathway. The double helix auger in the preferred embodiment, however, provides the necessary rolling required for maximum effective microwave heating of the material, as will be explained further hereinafter. The double helix augers 45 and 52 move the material within the drying chambers 40 and 50 in a volume arrangement shown in FIG. 7.

Positioned directly above the primary chamber 40 in housing 26 and slightly off-center from the primary drying chamber are the microwave producing magnetrons 30 and their respective wave guides 54, as shown in FIG. 1. The magnetrons 30 provide the primary source of heat input for the invention. Referring again to FIG. 7, the cross section view shows one of the wave guides 54 directing microwaves into the primary chamber 40 where the heat is then concentrated on the volume of material being moved along the auger pathway in a flow arrangement shown in FIG. 7. The desired rolling action of the auger results in more material along one side of the drying chamber as seen in FIG. 7, and the magnetrons are offset as shown to direct their energy to the location of the majority of the material at any instant.

Along the upper portion proximate the exit port 47 end of the primary chamber 40 is mounted an air outlet 55. Outlet 55 provides an exit means for removing air and the liquid evaporated, preferably in the form of an aerosol mixture. It is in fluid communication with a vacuum pump 56 which provides the means for creating the low pressure in the drying chambers and carrying the aerosol mixture away from the chambers 40 and 50 into the recycling areas of the invention which will be discussed in detail in the explanation of the operation of the invention below. Outlet 55 is preferably placed at the process center, rather than the geometric center of the transport path through the drying chamber. The process center is the point from which equal amounts of drying take place in upstream and downstream directions to the material entrance and exit, respectively. Since more evaporation takes place in the primary chamber, the process center will be somewhere along it, rather than at the midpoint between the two drying chambers. Locating the outlet at the process center provides greatest efficiency in terms of removal of vapor and aerosol by the sweep air.

The secondary drying chamber 50 is positioned directly below the primary drying chamber 40. A vacuum-like condition is also maintained in the secondary chamber 50. However, unlike the primary chamber 40, there is no microwave heating of material within the secondary chamber 50. Further drying of the material, however, does occur within the secondary chamber 50 and will be more fully disclosed hereinafter in the discussion of the operation of the invention.

The double helix auger 52 contained within the secondary chamber 50 again provides the desired auger pitch and rolling of the material as discussed above. In the embodiment shown the secondary auger has the opposite sense from that of the primary auger so as to transport the material in the direction indicated by the arrows in FIG. 1. The secondary auger 52, as in the primary auger 45, has a hollow shaft wherein hot water can flow through the entire length of the shaft. FIG. 1 shows the entry of the hot water at the end 61 of the secondary auger 52. The hot water then flows through the entire length of the secondary auger shaft 60 exiting the secondary auger shaft into a fluid connection 62 to the primary auger shaft 51. The water then flows through the entire length of the shaft 51 where it exits the primary auger shaft at the area designated by 63 in FIG. 1. Augers 45 and 52 act as heat exchangers for transferring heat from the water or liquid travelling therethrough to the material in the drying chambers. The exiting flow of water is carried by suitable piping means 64 to the first heat exchange 14 for recycling purposes.

At one end of the secondary drying chamber 50 is the exiting port 67 for the now dried material ready for removal from the apparatus of the invention. The material is deposited outside the apparatus in increment portions by a rotating fluid-lock valve 65 identical to the valve 36. The rotating fluid-lock valve 65 is positioned slightly below the exit port 67 of the secondary chamber 50.

Rotating lock valves 36 and 65 are mechanically linked to the operation of the auger system to provide a continuous motion system which deposits material into the drying chamber 40 in increments of volume equal to a small percentage of auger volume. Linking the driver to the air-lock valves and augers permits use of a single motor and assures compatible material transfer rates. An embodiment of the invention having a plurality of side-by-side dryers of the type shown in FIG. 1 is indicated in FIG. 5. The broken shafts shown are illustrative of the location of the auger shafts of the plural dryers in relation to the linkage elements. FIG. 6 further illustrates the series arrangement of drying chambers and their respective air-lock valves.

Outside the housing 66 off the drying chambers an air flow regulating means 70 is positioned having an intake port 71 to allow the entrance of outside air into the drying chambers 40 and 50. The air then proceeds in two paths 72 and 73 into the secondary drying chamber 50 and the primary drying chamber 40, respectively. These inlets to the drying chambers are located proximate the process ends of the chambers as shown in FIG. 1. They provide to each drying chamber a flow of air which sweeps the respective chamber in the direction toward outlet 55. These outside air sweeps combine with the evaporated solution of the drying material to form an aerosol mixture which is then removed by the vacuum pump. Regulator 70 is a pressure regulating valve which functions to control air input to maintain a predetermined low pressure within the drying chambers.

The preferred embodiment of the invention as shown in FIG. 1 uses a double passage for the drying of the material. The second passage through the secondary chamber 50 is preferred but is not necessary. Then primary drying chamber 40 could be used alone. However, the use of the secondary drying chamber 50 provides additional drying of the material as well as cooling the material before it is deposited for storage purposes in its dried condition.

Outside the drying chamber are located additional elements of the invention as can be seen in FIG. 1. The vacuum pump 56 is one of the elements. Other elements are a cyclonic particle separator 74, a water pump 75 and a water flow and level control means 76 as well as all of the necessary mechanical linkages and piping means.

A fluid conduit means 80 connects the outlet 55 to the vacuum pump 56. Further fluid conduit means 81 connects the vacuum pump 56 to the separator 74. The fluid conduit means 80 and 81 can be any standard pipe or tubing opaque to microwave energy which is well insulated in order to prevent condensation of the aerosol as it is transported from the outlet 55 to the separator 74.

As is shown in FIGS. 8 and 9, the separator 74 in the preferred embodiment is similar to a standard cyclonic separator familiar to those skilled in the art. The aerosol enters the separator in a heated, compressed state from the vacuum pump 56, and begins a circular path of travel along the helical element 82 located in the upper portion of the separator 74. During the helical path travel, the aerosol will lose droplets of water to the water already contained in the separator. The aerosol at the conclusion of its flow along the helical element will exit the separator through the port 83 provided at the top of the separator as can be seen in FIG. 9. The exiting aerosol, however, is now more like a vapor mist than an aerosol mixture after having given up its large water droplets in its movement along the separator's helical element. As shown in FIG. 1, the vapor mist released from the separator is carried through a fluid conduit means 84 of suitable insulated construction to the heat exchanger 15 where the hot vapor mist will be used in the heat exchanger 15 to transfer its heat to the air being forced through the heat exchanger 15 by the blower 16 as explained earlier in this description. The heat exchanger 15 will subsequently vent condensed water removed from the vapor mist as shown in FIG. 1, designated at 85.

The water droplets collected from the aerosol mixture in the separator 74 become a part of a volume of water continually maintained at a level slightly above the bottom portion of the helical element as can be seen in FIGS. 8 and 9. This water level is maintained by a water level control means located near the bottom of the separator 74 as shown in FIGS. 1 and 9. A suitable water level control means 76 can be a standard standpipe control or a pressure measuring valve assembly. It is important to the proper functioning of the separator 74 that the fixed volume of water is maintained in the separator. The water level control means 76 is further capable of venting any excess volume of water not required in the separator as indicated at 86.

Also, within the separator there are a number of heating elements 90, for instance, electrical resistance heaters, which are used only for initial start-up of the process to enable the separator 74 to heat its volume of water to a high temperature. In FIGS. 1 and 9, the exit port 91 allows hot water to be pumped from the separator 74 by the water pump 75 through suitable insulated fluid conduit means 92 to the entrance port 61 of the hollow shaft 60 of the secondary auger 52 where the hot water will flow in the path described earlier through the shafts of both augers into conduit means 64 and on to the heat exchanger 14 in the preheater section of the invention, entering at 32 as shown in FIG. 1. The water flows through the water-to-air type heat exchanger 15 exiting at 33 into fluid conduit means 68 which will transport the water back to the water level control means 76 where a substantial volume of the water will be returned to the separator 74 and the excess beyond the amount required to maintain the predetermined level will be discarded at 86. This amount depends upon the amount of water removed from the material in the drying process.

As can now be appreciated in light of the schematic flow chart of FIG. 1, the present invention not only effectively dries the material but also recovers and recycles all forms of heat energy in the air and water used in the processes of the invention in order to greatly diminish the energy demands normally required by conventional drying systems.

Operation of the Preferred Embodiment

The operation of the invention involves an interconnected system of energy flow, transportation of material, and recovery of spent energy for recycling within the invention. The invention will be described in the two broad categories of the drying process, and energy recovery.

For simplicity, the drying process will be explained in terms of removal of water from grain. However, the invention is not so limited, but is applicable to removal of water, other solvent, or other vaporizable liquid from a wide variety of materials. The drying process for the material begins as the material, for example grain, is fed from the hopper into the preheater section 12. As a layer of grain passes through the preheater section, warm dry air is forced from the blower end of the section across the layer of wet grain, to raise the temperature and remove some moisture from it. The resulting moist air mixes with pre-heated makeup air and the mixture is recirculated. The moisture that was picked up as the warm air swept the layer of grain helps transfer heat energy within the heat exchangers. This arrangement is energy efficient not only in recovering and recycling the heat in exchangers 14 and 15 from the main drying process, but also in that the makeup air as it is drawn through the apparatus in a pathway to the preheating section utilizes heat dissipated by the electrical elements, motors, and magnetrons situated along the duct 25 for the makeup air.

The rotary air-lock valve 36 accepts a certain volume of grain and transfers it into the primary low pressure drying chamber 40 while preventing substantial unwanted input of air to the drying chamber. Once inside the primary low pressure chamber moving with the heated auger 45, the drying process for that portion of grain begins.

The preferred embodiment illustrates the use of two drying chambers under low pressure. However, it should be understood that a single chamber or any number of chambers and augers could be used in accordance with the invention. The use of two chambers is for discussion purposes of a preferred embodiment only and is not to be viewed as a restriction on the invention.

The present invention is operated with the drying chambers under reduced pressure. At the present time a vacuum of 8 to 15 inches of Hg appears sufficient. However, it should be understood that the vacuum level will undoubtedly vary with the type of material being dried as well as the vaporizing characteristics of the liquid to be removed.

The evaporation of water molecules from the grain is the essential aspect of any drying process. The rate of evaporation is determined by the partial pressure of the evaporating molecules in their surroundings. The partial pressure of a substance can be expressed as the vapor pressure of the evaporating substance divided by the total pressure of the vessel containing the substance. Assuming a substance's partial pressure is constant at a fixed temperature, it is readily apparent that a decrease in the total pressure of the vessel willthen increase the vapor pressure of the evaporating substance. The net result will then be an increased rate of evaporation of the substance in relation to the pressure decrease in the surroundings of the evaporating substance. The lowered pressure in the drying chamber thus increases the rate of evaporation.

The evaporation efficiency of the inventin can be further illustrated in the following comparison of prior art with the present invention. In a prior art dryer, the material is heated and its water released by evaporation to the surroundings in the form of water vapor capable of escaping a certain distance from its point of origin. As evaporation continues to occur, the surroundings become saturated and a portion of the vapor returns to the material, a common problem in the conventional methods. Effective evaporation ceases when the surroundings become saturated. With the present invention, such problems are greatly diminished due to evaporation occuring within a chamber of reduced pressure. The reduced pressure increases the mean free path of the vapor molecules and accordingly the increased mean free path allows the vapor molecule to escape further from its point of origin than would be possible under atmospheric pressure. In conjunction with the reduced pressure, there is provided an air sweep through inlets 72 and 73 which effectively removes the vapor as it is formed, eliminating the problems of saturated surroundings.

Additional important efficiency is achieved through the formation of aerosol in the drying chamber. The air admitted through inlets 72 and 73 has a temperature (after undergoing the pressure drop to the operating pressure within the chamber) lower than the dew point in the chamber. The mixing of this sweep air with the vapor quickly recondenses some of the vapor to form the aerosol mixgture of air, vapor and liquid droplets, which is removed from the drying chambers by the air sweep and vacuum pump. The aerosol is important because it occupies very much less volume than the same amount of the liquid would occupy in pure vapor form. The aerosol can then be removed as a relatively small volume. Without aerosoling action, a much larger volume of gas would have to be removed from the drying chamber to maintain the same drying rate, and this would require a larger vacuum pump or a great number of them. The operating cost in terms of energy input, as well as the initial hardware cost of the pump, would be much higher. Aerosol formation thus leads to important cost savings.

In contrast with the prior art, the present invention's combination of a reduced pressure chamber and a cool air sweep provides a means for achieving superior drying rates which are evident further when the heat input for the drying chamber is understood. As evaporation occurs, the grain particles lose latent heat of vaporization of the water when the most energetic molecules leave the grain particle. Unless this loss of heat of vaporization is replaced, the temperature of the grain drops substantially in comparison to its entering temperature. In some instances, the material could possibly freeze, causing damage to the quality of the material. Further, as the temperature of the grain or other material drops, there is a consequent drop in vapor pressure and accordingly a noticeable decrease in the rate of evaporation. The present invention provides a continuous heat input which avoids the problems caused by a temperature drop in the grain.

The preferred embodiment uses microwave energy to provide the continuous, controlled heat input. The microwave frequency range which best penetrates and efficiently converts to heat within the absorbing substance is the range to be used in the present invention. The exact frequency will vary with the type of material and liquid involved, but in general it has been found that the frequency range of $10^5$–$10^{10}$ Hz proves quite satisfactory for the purposes of this invention. It is the $10^5$–$10^{10}$ range of electromagnetic radiation (microwaves) which will induce a state of oscillating dipoles in the polar molecules of the evaporating substance resulting in a polar vibration which will be manifested in a rise in temperature. Water is particularly receptive to microwave energy at approximately 2450 MHz for the temperature normally to be encountered for drying grain, and that frequency is most advantageously used for grain drying. The water readily absorbs the microwave energy and converts it to heat energy to attain the heat of evaporation while at the same time allowing the microwaves to pass through the rest of the grain particle. The proteins, oils and starches of the grain are much less efficient in absorbing microwaves. The grain particle is thus not subjected to damaging levels of heat in order to achieve evaporation of its liquid. Further, the wetter the particle to be heated, the more microwave energy it will absorb. The less wet the particle, the more microwave energy it will allow to pass through, yielding a dry product over a wide range of variations in moisture content of the grain.

In addition to the even drying results, the combination of microwave heating in a reduced pressure chamber drastically reduces the fire hazards common in the prior art dryers as combustion will be virtually impossible within the reduced pressure chamber. An additional benefit of the drying process of the present invention is the resulting superior quality of the dried product because of the lower operating temperatures than those of conventional processes.

Most of the drying will occur as a result of the heat input in the primary chamber of reduced pressure. However, important further drying continues within the secondary chamber of reduced pressure. As the grain is moved by the auger through the primary chamber, the particles acquire heat which is carried with them as the grain is transported into the secondary chamber. The relatively warm particles are allowed to tumble as the secondary auger moves along in the reduced pressure area without any further addition of microwave energy. The heat content of the warm particles is sufficient to complete the drying process, with heat input from the auger-heat exchanger preventing any freezing of the material due to the continuing loss of heat of vaporization in the reduced pressure, secondary chamber. The movement through the secondary chamber provides sufficient time for the grain to reach a cool condition, ready for immediate storage when it leaves the drying apparatus and without heat energy waste in the form of heat in the grain transferred to a storage area. This readiness for storage is a further improvement over the conventional dryers in the prior art.

Common to both drying chamber mechanisms is an auger shown in the preferred embodiment as a double helix auger, the advantages of which have been discussed earlier. Both augers have internal tubular passageways 51, 60 through which hot water is circulated. The augers are thus heated and the auger blades act as a heat exchanger to provide an additional heat source to the grain particles as they pass through the chambers along the augers. The propelling of the substrate by the heated augers in addition to the tumbling of the substrate along the auger path helps ensure even heating of the grain in conjunction with the microwave heating.

As should now be evident, the energy efficient drying process beings in the preheater section, is substantially accomplished in the primary low pressure drying chamber but is significantly continued in the secondary low pressure chamber with the final product being cooled grain of reduced moisture content and high quality.

A further energy efficient aspect of the invention results when the air sweeps remove the water or solvent molecules from the reduced pressure chambers before the molecules can recondense upon the material particles as is a common occurrence in conventional methods. Conventional grain drying methods generally have a cool layer of grain located between the layer of air into which the water vapor molecules escape and the grain layer immediately adjacent the heating element. This cooler layer of grain oftentimes becomes a "host" layer for molecules evaporating and escaping from the hottest layer of grain. The vapor molecules will oftentimes recondense upon the intermediate "host" layer until the "host" layer is also heated to a degree which allows the water molecule to finally escape from the layers of grain. The presence of an intermediate host layer of grain causes the continuing problems of uneven heating and diminishment of product quality due to subsequent overheating of the lower layer in order to heat the intermediate layer sufficiently to finally release the vapor molecules from their "host." Such problems cause a waste of expensive energy resources used to overheat the grain to achieve effective evaporation as well as damaging the quality of the product.

The problem of recondensation on intermediate host layers is virtually eliminated in the operation of the present invention. The reduced pressure chambers provide increased mean free paths of the vapor molecules, carrying the molecules further from the point where recondensation would be possible. The cooler air sweep through the reduced pressure chambers entrains the vapor molecules, creating an aerosol state and the aerosol is then carried away from the material before condensation of the evaporated substance can occur on grain particles. The microwave heating provides even heating of the grain rolled along by the auger so that potential "intermediate host" particles are as warm as the particles of origin, thereby effectively preventing condensation at that point in the process.

The drying process of the invention conserves valuable energy resources, while still providing superior drying rates in comparison with conventional methods. The substantial energy savings results primarily from the recovering of heat energy used in the drying process and recycling it for further drying.

The aerosol of air and vapor molecules does not escape into the atmosphere once removed from the reduced pressure chambers. The vacuum pump in the invention serves a dual function of reducing the pressure in the drying chambers and providing the means for transporting the aerosol out of the drying chambers without allowing the aerosol to condense further at that point. The vacuum pump also serves as a heat pump by compressing the cool, expanded aerosol into a compressed, heated aerosol.

After the compressed hot aerosol enters the separator, it is separated into liquid, which adds to the level of water maintained along the bottom edge of the separator, and hot air and vapor which are transported into heat exchanger 15 located near the preheat zone. Heat exchanger 15 not only recovers the heat of the air but also the latent heat of vaporization of the water. Once inside the heat exchanger, the vapor condenses releasing the heat of vaporization originally obtained in the drying chamber. A significant amount of heat is reclaimed from the latent heat of condensation and returned into the drying process in the preheater section of the invention. In this way, not only is the heat energy recovered and recycled but condensation has occured away from the grain, thereby saving additional drying costs common in conventional methods having condensation problems. The released air of the captured aerosol mixture is then forced out of the heat exchanger to join the air circulating through the preheater zone. Alternatively, it can be vented. The condensed liquid from the air-vapor mixture is vented from the heat exchanger and released outside the apparatus of the invention.

The water droplets of the aerosol left behind in the separator become a part of the water heat recovery system. Although the level of water in the separator is kept constant by means of the water level control valve device, there is a continuous flow of water through the invention. Water within the separator contains heat which can be reclaimed. The hot water is pumped from the separator at 91 by a standard water pump 75 and transported with minor or no heat loss into the end entry 61 of the hollow portion of the secondary auger 52. The hot water is pumped through the secondary auger shaft 60 and on through the hollow shaft of the primary auger 51. Heat is transferred through both augers to the grain in contact with their blades. When the water reaches the opposite end 63 of the primary auger 45 as shown in FIG. 1, it is directed into heat exchanger 14 where heat is transferred to the air being forced through the heat exchanger. The remaining cooled water is returned to the separator to help maintain the fixed level of water in the separator. Any excess water resulting from an increase in water volume as a result of evaporation of the material in the drying process is vented by the level controller 76 to a location outside the apparatus.

Auxiliary heating elements such as electrical resistance heaters are used to heat the water in separator 74 upon start-up of the process which has been sitting idle long enough to lose its heat, but the auxiliary heaters would not ordinarily be needed for continuous steady-state operation.

The schematic view of the invention in FIG. 1 should now be understood in light of the foregoing explanation. The invention in a broad sense serves not only as a dryer but also as a cyclic heat pump with the translocation of the liquids in their vapor states. The energy requirement for the invention once started is merely the amount necessary to compensate for inadvertent heat losses and to supplement the inherent incompleteness of the heat transfers. The microwave heat input of the present invention provides the makeup heat for such losses.

As can now be seen, the invention is self-contained and to a great degree self-sustaining. It is extremely energy efficient and provides a much needed, very significant improvement in the area of drying processes.

What is claimed is:

1. Apparatus for drying material, comprising:

a drying chamber for containing the material to be dried, said drying chamber having an outlet;

means operatively connected to said outlet for removing gas from said chamber to lower the pressure within said drying chamber;

means for applying microwave radiation energy to the material within the drying chamber to remove vaporizable liquid therefrom;

means for admitting a limited amount of gas into said drying chamber at a location spaced from said outlet for establishing a flow of gas generally across the material to be dried to remove from the chamber liquid vaporized from the material; and heat reclaim means operatively connected to said gas removing means and including heat exchange means for recovering heat energy from the gas and removed liquid from said chamber and for applying said heat to the material to be dried.

2. Material drying apparatus according to claim 1 including means defining a preheating zone for preheating material prior to drying in said chamber, including means for establishing air circulation through said preheating zone, and wherein said heat reclaim means includes a heat exchanger in thermal communication with said air circulation path to transfer at least a portion of said reclaimed heat to the material in the preheating zone.

3. Material drying apparatus according to claim 1 wherein said means for lowering the pressure includes a vacuum pump connected to draw gas and remove liquid from said drying chamber and apply them at increased pressure to said heat reclaim means so that energy added by said pump can be recovered by said heat reclaim means.

4. Material drying apparatus according to claim 1 wherein said means for admitting gas includes an air inlet and pressure regulating valve means for controlling the lowered pressure within said drying chamber.

5. Material drying apparatus according to claim 1 wherein said drying chamber includes a trough-like enclosure and including an auger in the enclosure for mixing and transporting the material through the chamber, said enclosure configured to permit the microwave radiation to pass therethrough to the material.

6. Material drying apparatus according to claim 5 wherein said auger has double flighting.

7. Material drying apparatus according to claim 5 wherein said auger has a hollow shaft, and wherein said heat reclaim means includes means for circulating at least a portion of said reclaimed heat through the hollow shaft so that the auger acts as a heat exchanger to transfer additional heat to the material being dried.

8. Material drying apparatus according to claim 1 including air lock valves for transferring material to and from said chamber, and admitting limited amounts of gas associated with said transfer into said chamber while maintaining the lowered pressure within said drying chamber.

9. Apparatus for drying material, comprising:

a drying chamber for containing the material to be dried;

material handling means, including means for introducing material to be dried and limited amounts of air associated therewith into said drying chamber, means for moving material through said drying chamber during the drying process, and means for removing dried material from said drying chamber;

means for applying microwave radiation energy to the material within said drying chamber to remove vaporizable liquid therefrom;

vacuum pump means connected to said drying chamber at an air outlet port thereof for exhausting air therefrom to maintain the lower pressure within said drying chamber;

said means for introducing material and limited amounts of air to said drying chamber positioned at a location remote from said air outlet port to maintain a flow of air from the introducing means generally across the material being dried to said air outlet port to remove as vapor or aerosol the liquid removed from the material; and heat reclaim means connected to receive air, vaporized liquid and aerosol removed from said drying chamber and including heat exchanger means for recovering heat energy including heat of vaporization therefrom and for applying said heat energy to the material to be dried.

10. Material drying apparatus according to claim 9 wherein said drying chamber includes a first drying area in which said microwave energy is applied to the material and a second drying area apart from the application zone of said microwave energy.

11. Apparatus for drying material according to claim 10 wherein said material moving means is adapted for moving said material through said first drying area and then through said second drying area.

12. Apparatus for drying material according to claim 9 wherein said drying chamber includes a first chamber and a second chamber, said first chamber being disposed generally above said second chamber, and wherein said means for moving material through the chamber is adapted for moving the material through the first chamber and then through the second chamber.

13. Apparatus for drying material according to claim 12 wherein said means for applying microwave energy is positioned for applying said energy only to said first chamber.

14. Apparatus for drying material according to claim 9 further including a plurality of air inlet vents for admitting air to said chamber and positioned to establish air flow generally across the material being dried, to said outlet port for removal from said drying chamber said vaporized liquid.

15. Material drying apparatus according to claim 14 wherein said air outlet port is positioned in said drying chamber at a location corresponding to the process center of the drying process.

16. Material drying apparatus according to claim 14 wherein said air inlet vents further include a pressure regulating air valve operative to maintain the lowered pressure within said drying chamber.

17. Material drying apparatus according to claim 9 wherein said means for introducing material and limited amounts of air into said drying chamber and means for removing dried material from said drying chamber include air lock valves.

18. Material drying apparatus according to claim 9 wherein said heat reclaim means is connected to an outlet of said vacuum pump means, to reclaim energy added by the vacuum pump means to the air and vaporized liquid in pumping from the drying chamber.

19. Material drying apparatus according to claim 9 wherein said heat reclaim means includes a heat exchanger in thermal contact with the material to be dried in a preheat zone prior to the introduction of the material into said drying chamber.

20. Material drying apparatus according to claim 9 further including means defining a preheat zone having air passages and a fan or blower for circulating air through the material to be dried prior to its introduction to said drying chamber, and wherein said heat reclaim means includes a heat exchanger in thermal contact with said air circulating through said preheat zone so that the heat from the air and vaporizable liquid drawn from the drying chamber, and the heat from condensation of vapor in the heat exchanger, are applied to the material to be dried.

21. Material drying apparatus according to claim 9 wherein said heat reclaim means includes a liquid-vapor separator connected to receive the output of said vacuum pump means.

22. Material drying apparatus according to claim 21 wherein the liquid separated by said separator is passed through a heat exchanger in thermal contact with material being dried within said drying chamber.

23. Material drying apparatus according to claim 20 further including means for directing a cooling airflow for recovering waste heat generated by the operation of said microwave energy means and for applying said cooling airflow and recovered heat as make-up air to the air circulating in the preheat zone prior to introduction to said drying chamber.

24. Material drying apparatus according to claim 22 further including means for preheating liquid in said separator at the start of the drying process.

25. Material drying apparatus according to claim 22 including an auger in said drying chamber which comprises the means for moving the material through said drying chamber, said auger having a hollow shaft, said shaft connected to receive the liquid from said separator so that said auger comprises a heat exchanger for applying heat to the material being dried.

26. Material drying apparatus according to claim 25 further including heating element means positioned within said separator for preheating liquid at the start of the drying process.

27. Apparatus for drying material comprising:
a vacuum drying chamber for containing the material to be dried;
means including air lock valves for introducing quantities of material to be dried and air into said drying chamber and for removing dried material from said drying chamber;
means for applying microwave radiation energy to the material within said drying chamber to remove vaporizable liquid therefrom;
vacuum pump means connected to said drying chamber at an air outlet port thereof for exhausting air therefrom to maintain lower pressure within said drying chamber;
said air lock valves positioned for admitting air to said drying chamber at a location remote from said air oulet port to maintain a flow of air generally across the material being dried to said air outlet port to remove the resulting aerosol mixture;
heat reclaim means connected to an outlet of said vacuum pump means to receive aerosol mixture removed from said drying chamber by said vacuum pump means and operative to recover heat energy added by said microwave energy means and by said vacuum pump means in pumping the aerosol mixture from the drying chamber;

said heat reclaim means including a liquid-vapor separator connected to receive the aerosol mixture from said vacuum pump means;

means for moving the material through said drying chamber including an auger having a hollow shaft connected to receive heated liquid from said separator so that said auger acts as a heat exchanger in applying heat to the material being dried within said drying chamber; and means defining a preheat zone including a passageway for directing the material to be dried to said drying chamber, means including air pathways in said preheat zone for circulating air therethrough, and a heat exchanger in thermal contact with said air circulating through said preheat zone so that the heat of the air and vapor from said separator is applied to the material in the preheat zone before the material enters said drying chamber.

28. Material drying apparatus according to claim 27 further including a hopper for containing the material to be dried outside the apparatus and for admitting the material into said preheat zone.

29. Material drying apparatus according to claim 27 further including an additional heat exchanger positioned in thermal contact with said air circulating through said preheat zone, and means for conveying the liquid to said additional heat exchanger after passage through said auger so that residual heat energy of said liquid is applied to the material in the preheat zone.

30. Material drying apparatus according to claim 27 further including means for drawing air to cool the microwave radiation means and supplying the air thus heated as makeup air to the air circulating in said preheat zone.

31. Apparatus for drying material comprising:

a vacuum drying chamber for containing the material to be dried, including first and second drying zones;

a vacuum pump connected to an air outlet port of said drying chamber;

means including air lock valves for introducing material to be dried into said drying chamber and means for removing dried material from said drying chamber;

means for applying microwave radiation energy to the material within the first drying zone of said drying chamber to remove vaporizable liquid therefrom;

a plurality of air inlets for admitting air to said drying chamber at locations proximate said first drying zone and proximate said second drying zone to maintain a flow of air from said inlet means generally across the material being dried to said air outlet port to remove the aerosol mixture, further including a pressure regulating air valve operative to maintain the pressure within said drying chamber in a predetermined range;

a liquid-vapor separator connected to receive the aerosol mixture from the vacuum pump;

means for moving the material through said drying chamber including an auger having a hollow shaft connected to receive liquid from said separator so that said auger acts as a heat exchanger in applying heat reclaimed from the liquid to the material to be dried within said drying chamber;

means for defining a preheat zone including a passageway for directing the material to be dried from a hopper to one of said air lock valves for introduction to said drying chamber, means including air pathways for circulating air through said preheat zone, and a heat exchanger in thermal contact with said air circulating through said preheat zone so that the heat energy of the air and vapor from said separator is applied to the material in the preheat zone before the material enters said drying chamber; and an additional heat exchanger positioned in thermal contact with said air circulating through said preheat zone, and means for conveying the liquid to said additional heat exchanger after passage through said auger, so that residual heat energy of said liquid is applied to the material in the preheat zone.

32. Material drying apparatus according to claim 31 further including means for supplying a flow of air to remove excess heat generated by the microwave radiating means and for supplying the air thus heated as make-up air to the air circulating in the preheat zone.

33. A method for drying material contained in a chamber comprising the steps of:

removing gas from the chamber to lower the pressure within said drying chamber;

applying microwave radiation energy to the material within said drying chamber to vaporize liquid from the material;

removing vaporized liquid from said drying chamber by admitting a limited amount of gas to said chamber to flow generally across the material to the gas removal location;

recovering heat energy from the gas and liquid removed from the chamber, including heat of vaporization of the liquid; and applying the recovered heat to material to be dried.

34. A method for drying material, comprising the steps of:

placing the material to be dried in a drying chamber;

lowering the pressure within said drying chamber by removing air therefrom through an outlet;

transporting the material to be dried through said drying chamber during the drying process;

applying microwave energy to the material within said drying chamber to remove vaporizable liquid therefrom;

admitting airflow into said drying chamber to entrain and remove from said drying chamber through the outlet, as vapor or aerosol, the liquid removed from the material;

recovering heat energy from the vapor or aerosol removed from the drying chamber; and applying the recovered heat to material to be dried.

35. A method for drying material within a chamber comprising the steps of:

preheating the material to be dried;

transporting the material to be dried to a drying chamber after the preheating;

maintaining a low pressure within said drying chamber by removing air from the drying chamber;

moving the material through the drying chamber during the drying process;

applying microwave radiation energy to the material within said drying chamber to remove vaporizable liquid therefrom;

admitting air to said drying chamber at a location remote from the place of air removed therefrom to establish an air flow across the material being dried, thereby removing the vaporizable liquid as vapor or aerosol from the drying chamber;

removing dried material from the drying chamber;

reclaiming heat energy used in the drying process, including the heat of vaporization of the vaporized liquid; and applying at least a portion of the reclaimed heat to preheating the material.

36. A method according to claim 35 further including the step of applying a portion of the reclaimed heat to heating of the material in the drying chamber.

37. A method of drying material, comprising the steps of:

placing the material in a vacuum drying chamber;

applying microwave energy to the material in the chamber to evaporate liquid from the material;

admitting a limited amount of cool air to the chamber to mix with the vapor and form an aerosol mixture;

maintaining low pressure within the vacuum drying chamber by removing the aerosol from the chamber;

recovering heat energy from the removed aerosol, including latent heat of vaporization; and applying the recovered heat to the material.

* * * * *

UNITED STATES PATENT AND TRADEMARK OFFICE
CERTIFICATE OF CORRECTION

PATENT NO. : 4,330,946

DATED : May 25, 1982

INVENTOR(S) : Calice G. Courneya

It is certified that error appears in the above—identified patent and that said Letters Patent is hereby corrected as shown below:

Column 6, line 45, "off" should be --of--.

Column 9, line 10, "willthen" should be --will then--.

Column 9, line 17, "inventin" should be --invention--.

Column 9, line 46, "mixgture" should be --mixture--.

Column 11, line 16, "beings" should be --begins--.

Signed and Sealed this

Tenth Day of August 1982

[SEAL]

Attest:

Attesting Officer

GERALD J. MOSSINGHOFF

Commissioner of Patents and Trademarks